June 2, 1953     C. H. HAYNES     2,640,906
ELECTRICAL HEATING DEVICE

Filed June 2, 1949

INVENTOR.

Clyde H. Haynes

Patented June 2, 1953

2,640,906

UNITED STATES PATENT OFFICE 2,640,906

ELECTRICAL HEATING DEVICE

Clyde H. Haynes, Elyria, Ohio

Application June 2, 1949, Serial No. 96,779

4 Claims. (Cl. 219—37)

My invention relates to electrical heating elements having conductive and non-conductive films sandwiched together, and especially the heating of localized areas of a surface member by a plurality of these electrical heating elements.

One of the most common uses of my invention is in the manufacture of household cooking stoves. In the past, electric cooking stoves have had open coils sticking through the top surface of the stove. These coils have made it difficult to keep the stove real clean and have required a lot of work in cleaning the small cracks and small surfaces in the coils. Many times a pan would boil over and the contents spill into the coils, thus requiring them to be removed for cleaning.

I have discovered an electrical heating element which may be mounted on the under surface of the stove top. With these electrical heating elements engaging a localized area of the stove top, I have found that the whole surface of the stove top may be constructed perfectly level and smooth. The stove may be cleaned very quickly and easily since the top is a smooth and waterproof surface.

Therefore, one of the objects of my invention is to provide an electrical heating unit having a surface of predetermined area with at least one sandwich heating element engaging an area less than the predetermined area of the electrical heating unit.

Another object of my invention is to provide a surface member having a surface of predetermined area with means for heating a plurality of localized areas which are less then, and merge with the predetermined surface area.

Another object of my invention is to provide an electrical sandwich element comprising a plurality of non-conductive and conductive films sandwiched together.

Still another object is to provide an electrical heating element having non-conductive films and conductive resistance films sandwiched together and adapted to be connected in various electrical circuit connections.

Other objects and a fuller understanding of my invention may be had by referring to the following description and claims, taken in conjunction with the accompanying drawings, in which:

Figure 1:
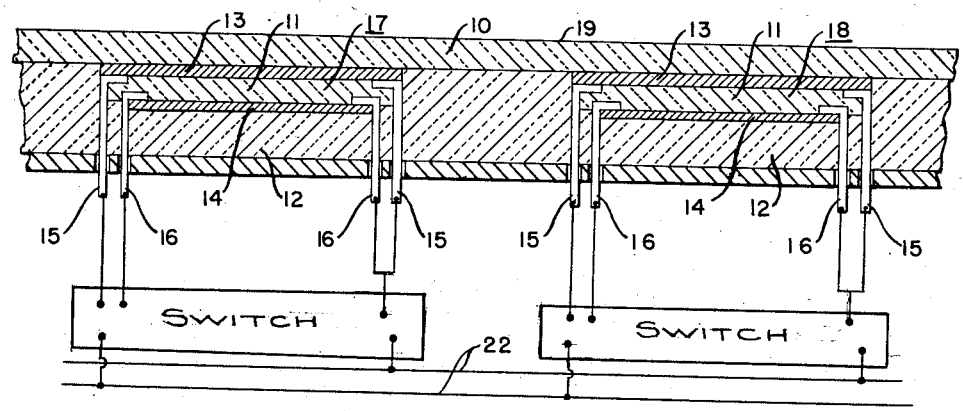
Figure 1 is a cross-sectional view of an electrical heating unit illustrating the use of my sandwich heating elements.

My electrical sandwich heating element as is illustrated in Figure 1 comprises non-conductive films 10, 11, and 12 sandwiched together with conductive films 13 and 14. In this Figure 1, I illustrate the non-conductive films 10 and 11 as being constructed from a form of glass, and the non-conductive film 12 from a heat insulating material. The non-conductive films may be of any suitable material which will withstand the heat generated by the conducted films, and which will electrically insulate one film from the other film. When the non-conductive film 10 is used as the top of the cooking stove, and is constructed from glass, the sandwich element becomes visible relative to the stove top surface so that the localized heat area may be readily located. The conductive films 13 and 14 may be constructed of any resistance material which will conduct electricity. The film may be a coating or a lamination material which is relatively thin whereby the films may be sandwiched together.

The conductive film 13 is electrically connected to an electrical switching mechanism by means of terminals 15. These terminals 15 electrically engage the conductive film 13 at spaced points of engagement and extend outwardly from the sandwich unit thus providing electrical connection terminals for the film 13. Similarly, terminals 16 engage the conductive film 14 and provide electrical connection terminals for this film. It is understood that any suitable switching mechanism may be used which will control the circuit connection of the conductive films 13, and 14 to a source of electricity 22. The switching mechanism illustrated symbolically in Figure 1 may be any conventional switch which permits the energization of either conductive film individually, the energization of the conductive films in series, and also the energization of the conductive films in parallel circuit.

Figure 3:
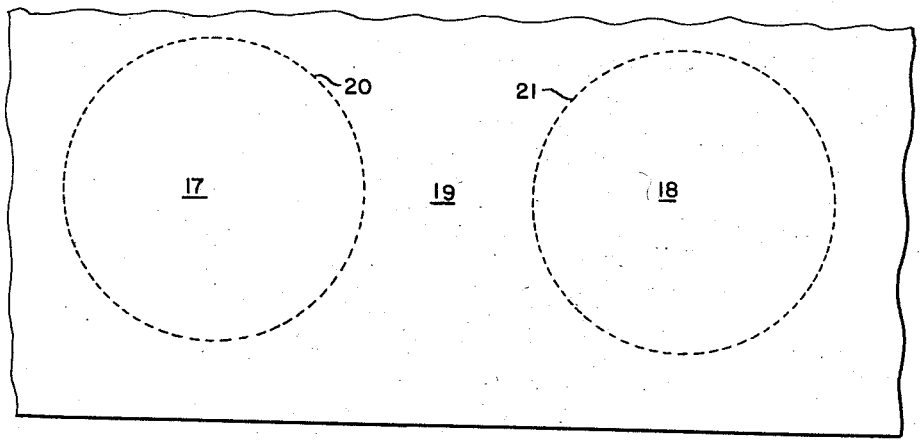
Figure 3 represents the top surface of an electrical heating unit with the localized heated surface areas being represented by dotted lines.

In Figure 1, I illustrate a plurality of sandwich heating units such as the heating units 17, and 18 mounted on a common member herein illustrated as the non-conductive film 10. The non-conductive film or member 10 may be an electrical stove top having a surface 19 of predetermined area. In Figure 3, I best illustrate by means of dotted lines that the area of the stove top 10 engaged by the sandwich heating element 17 or the sandwich heating element 18 is less than the predetermined area of the surface 19. When the heating element 17 is energized, a localized area substantially bounded by the dotted line 20 of Figure 3, of the surface 19 will be heated. Similarly when the sandwich heating element 18 is energized a localized area bounded by the dotted line of the surface 19 will be heated. I have thus provided an electrical heating unit wherein a plurality of conductive and non-conductive films are sandwiched together and engage, and thereby heat a localized area of a surface member having a predetermined area greater than the localized area.

Figure 2:
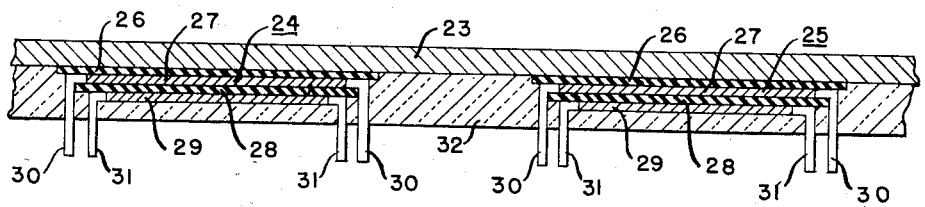
Figure 2 is a cross-sectional view illustrating a modification of my electrical heating unit.

In Figure 2, of my drawings I illustrate another form of my invention. In this instance a surface member 23, engaged by a plurality of heating elements including the heating elements 24, and 25. The heating elements 24, and 25 each heat a localized area of the total surface area of the surface member 23. The surface member 23 may be metal as illustrated in the drawing, or any other material which has a continuous smooth surface. The heating element 24 is constructed by applying a film or coating of non-conductive material 26 onto localized area of the surface member 23.

Next a conductive material may be coated on this non-conductive material 26 with the non-conductive material 26 insulating the conductive material 27 from the surface member 23. The sandwich heating element 24 is completed by applying another coating of non-conductive material 28, and then a coating of conductive material 29. The heating element 25, is constructed similarly with like members representing like parts of the heating element 24.

Terminals 30 provide electrical connection means by connecting the conductive material 27 to a source of energy, and terminals 31 provide means for connecting the conductive material 29 to a source of energy. The heating elements comprising the conductive and non-conductive materials sandwiched together may then be covered by glass 32, or any other waterproof insulation material which will withstand heat generated by the heating elements.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An electric stove top providing a plurality of individual localized heat areas for cooking, said stove top comprising, a single supporting member of electrically non-conductive heat insulating and heat resistant material having a top surface, said single supporting member having a plurality of recesses therein opening on said top surface and defining localized heat areas with the recesses spaced from each other and providing a plurality of individual bottom surfaces, a first individual electrically conductive heat producing coating adherently applied only to each individual bottom surface, a first electrically non-conductive coating adherently applied only to each of said first electrically conductive heat producing coatings within each recess, a second individual electrically conductive heat producing coating adherently applied only to each of said electrically non-conductive coatings within each of said spaced recesses, said first and second conductive heat producing coatings and said first non-conductive coating in each recess having a combined thickness generally equal to the distance between said bottom surface and said top surface thereby positioning said second heat producing coating in the general plane of said top surface, and a thin coating having physical properties tending to prevent transmittal of heat from said localized heat area to the remainder of the thin coating, said thin coating of smooth water-proof heat resistant material electrically non-conductively and adherently applied to all of the second individual conductive coatings in said spaced recesses and also adherently applied to all of the top surface of the member between the spaced recesses and thereby forming therewith a smooth water-proof surface top for an electric stove.

2. An electric stove top providing a plurality of individual localized heat areas for cooking, said stove top comprising, a single supporting member of electrically non-conductive heat insulating and heat resistant material having a top surface, said single supporting member having a plurality of recesses therein opening on said top surface and defining localized heat areas with the recesses spaced from each other and providing a plurality of individual bottom surfaces, a first individual electrically conductive heat producing coating adherently applied only to each individual bottom surface, a first electrically non-conductive coating adherently applied only to each of said first electrically conductive heat producing coatings within each recess, a second individual electrically conductive heat producing coating adherently applied only to each of said electrically non-conductive coatings within each of said spaced recesses, said first and second conductive heat producing coatings and said first non-conductive coating in each recess having a combined thickness generally equal to the distance between said bottom surface and said top surface thereby positioning said second heat producing coating in the general plane of said top surface, and a single smooth water-proof coating of electrically non-conductive heat insulating and heat resistant material adherently applied to all of the second individual conductive coatings in said spaced recesses and also adherently applied to all of the top surface of the member between the spaced recesses and thereby forming therewith a smooth water-proof surface top for an electric stove.

3. An electric stove top as set forth and defined in claim 2 wherein the area of the first electrically conductive heat producing coating is different than the area of the second electrically conductive heat producing coating.

4. An electric stove top as set forth and defined in claim 1 wherein the thin coating contains metallic material.

CLYDE H. HAYNES.

References Cited in the file of this patent

UNITED STATES PATENTS

| Number | Name | Date |
|---|---|---|
| 617,375 | Voigt et al. | Jan. 10, 1899 |
| 1,476,116 | Thompson | Dec. 4, 1923 |
| 1,672,724 | McCormick | June 5, 1928 |
| 1,711,472 | Lewin | Apr. 30, 1929 |
| 2,119,680 | Long | June 7, 1938 |
| 2,179,934 | Jones | Nov. 14, 1939 |
| 2,276,005 | Vouvalidis | Mar. 10, 1942 |
| 2,321,587 | Davie et al. | June 15, 1943 |
| 2,367,626 | Shroyer et al. | Jan. 16, 1945 |
| 2,409,244 | Bilan | Oct. 15, 1946 |
| 2,416,645 | Rutenber | Feb. 25, 1947 |
| 2,429,420 | McMaster | Oct. 21, 1947 |
| 2,495,788 | Trist | Jan. 31, 1950 |

FOREIGN PATENTS

| Number | Country | Date |
|---|---|---|
| 461,275 | Great Britain | Feb. 15, 1937 |
| 606,894 | Great Britain | Aug. 23, 1948 |